Nov. 19, 1929.  J. O. ECKER  1,736,258
INFLATION DEVICE FOR PNEUMATIC TIRES
Filed June 11, 1928
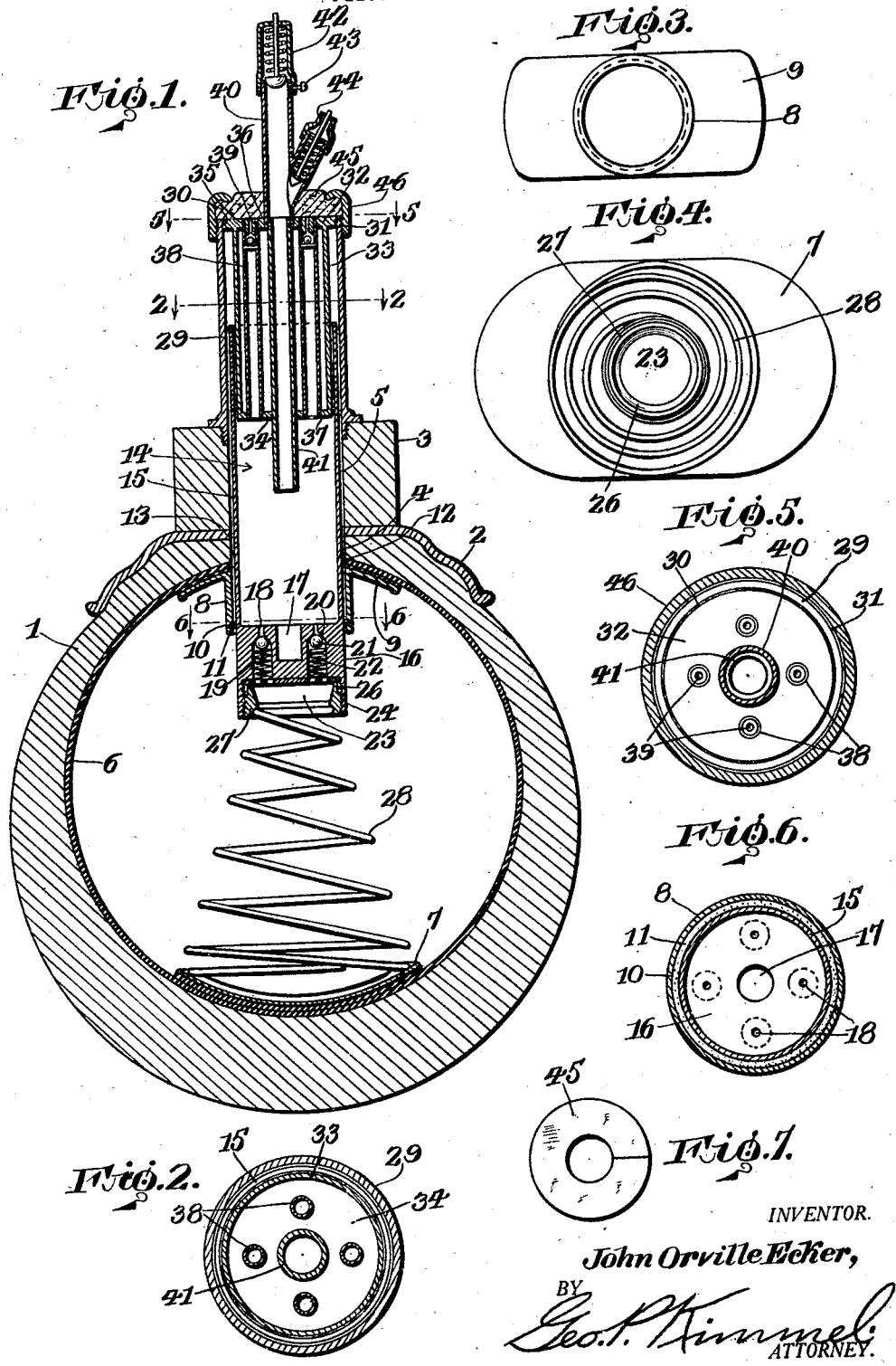
INVENTOR.
John Orville Ecker,
BY
Geo. P. Kimmel
ATTORNEY.

Patented Nov. 19, 1929

1,736,258

UNITED STATES PATENT OFFICE

JOHN ORVILLE ECKER, OF SAN MATEO, FLORIDA

INFLATION DEVICE FOR PNEUMATIC TIRES

Application filed June 11, 1928. Serial No. 284,617.

This invention relates to an automatically operable inflation device for pneumatic tires, and has for its object to provide, in a manner as hereinafter set forth a device of such class operated from the tire during the travel thereof for automatically supplying air thereto to maintain it under a proper state of inflation.

Further objects of the invention are to provide, in a manner as hereinafter set forth an automatically operable tire inflation device which is comparatively simple in its construction and arrangement, strong, durable, compact, thoroughly efficient in its use, automatic in its action, readily installed with respect to a tire, and comparatively inexpensive to set up.

With the foregoing and other objects in view the invention consists of the novel construction, combination and arrangement of parts as hereinafter more specifically described and illustrated in the accompanying drawings wherein is shown an embodiment of the invention, but it is to be understood that changes, variations and modifications can be resorted to which fall within the scope of the claims hereunto appended.

In the drawings wherein like reference characters denote corresponding parts throughout the several views:

Figure 1 is a vertical sectional view of a pneumatic tire showing the adaptation therewith of an inflation device in accordance with this invention.

Figure 2 is a section on line 2—2 Figure 1.

Figure 3 is an inverted plan of a guide sleeve.

Figure 4 is a fragmentary view in top plan illustrating the controlling spring and its mounting.

Figure 5 is a section on line 5—5 Figure 1.

Figure 6 is a section on line 6—6 Figure 1.

Figure 7 is a top plan view of a packing member.

Referring to the drawings in detail 1 denotes the outer casing or shoe of a pneumatic tire and which is connected to a rim 2 carried by a felloe 3. The opposed edges of the casing 1 are arranged to provide a clearance 4 for the purpose to be hereinafter referred to and the felloe 3 is provided with an opening 5 which registers with the clearance 4. The inner tube of the tire is indicated at 6 and which has vulcanized to its inner face a metallic plate 7 of concavo-convex cross section. The plate 7 is vulcanized to the inner face of the tube 6 at the outer portion of the latter and vulcanized to the inner face of the tube 6 at the inner portion of the latter and opposing the plate 7 is a flanged guide sleeve 8. The flange of the sleeve 8 is indicated at 9 and it is vulcanized to the inner face of the inner tube 6. The sleeve 8 extends inwardly from the inner portion of the tube 6 and has its inner face in proximity to its free end formed with an annular groove 10 in which is arranged an annular packing member 11, preferably of rubber, and which projects from the inner face of the sleeve 8.

The tube 6 is provided with an opening 12 which registers with the inner face of the sleeve 8 and also registers with the wall of the clearance 4 and opening 13 formed in the rim 2 and with the wall of the opening 5 provided in the felloe 3.

Extending through the opening 5 in the felloe 3, as well as through the opening 13 in the rim 2, clearance 4 in the shoe 1, opening 12 in the tube 6 and through the sleeve 8, as well as projecting inwardly from the latter is a resiliently supported shiftable plunger referred to generally at 14 and which includes a tubular part 15 having formed integral with the inner end thereof a head 16 provided with a centrally disposed socket 17, a plurality of spaced air supply ports 18, a plurality of valve chambers 19 which open into the ports 18, a valve seat 20 at the inner end of each chamber, a check valve 21 within each chamber and coacting with the seat 20 to close a port 18, and a controlling spring 22 within each chamber 19 and constituting means for normally maintaining the valve 21 in position to close the ports 18.

The head 16 at its inner end is formed with an annular recess 23 with the wall thereof threaded as at 24 and positioned within the recess and extending across the valve chambers 19 at the inner ends thereof is an apertured disc 25 for retaining the spring 22 in position. The disc 25 has its apertures so positioned to establish communication between the valve chambers 19 and the recess 23 and said disc has a threaded flange 26 for engagement with the threaded walls of the recess 23.

Positioned within the recess 23 and threadedly engaging with the wall thereof and further overlapping the flange 26 and abutting the disc 25 is a coupling member 27 for the controlling spring 28 of the plunger 14. The spring 28 is of spiral form, has one end connected to the coupling member 27 and its other end seated in the plate 7, and which provides for normally maintaining the plunger 14 in the position as shown in Figure 1. The packing 11 engages with the outer periphery of the plunger 14.

Secured to the felloe 3 and extending inwardly therefrom is a cylinder or casing 29 into which extends the plunger 14 and that part of the plunger 14 which extends into the cylinder 29 is positioned in close proximity to the inner face of the latter. The cylinder 29 at its rear end has threads 30 on its inner face and threads 31 on its outer face. The rear end of the cylinder 29 is closed by a cap 32 which engages with the threads 30. Formed integral with the inner face of the cap 32 and extending into the plunger 14, but spaced therefrom is a hollow, stationary plunger 33 having its forward end provided with a head 34. The cap 32 provides the rear head of the plunger 33, but it is of greater diameter than the diameter of the latter.

The cap 32 is provided with a plurality of openings 35 which are arranged in spaced relation and said cap 32 is furthermore provided with a centrally arranged opening 36 of greater diameter than any of the openings 35. The head 34 is formed with a plurality of spaced openings 37 which align with the openings 35. Each pair of aligning openings has fixed to the walls thereof an air conducting tube 38.

That end of each tube 38 which is attached to the cap 32 is provided with a check valve 39. Disposed centrally with respect to the plunger 33 is an air intake tube formed of an outer and an inner section 40, 41 respectively. The rear end of the section 41 is extended into and connected to the forward end of the section 40 and the latter has its forward end secured to the cap 32 in the opening 36 of the latter. The section 41 is of a length to extend from the cap 32 through and project from the head 34 of the cylinder 33. Connected to the rear end of the section 40 is a pressure regulator 42 and which includes a set screw 43 for engagement with the section 41. Connected to and projecting from the section 40, as well as communicating therewith, is an air intake valve 44 which is employed for filling purposes at stations. The air intake valve 44 is disposed at an inclination with respect to the section 40.

Mounted upon the cap 32 is a combined packing and filtering member 45 through which extends the section 40 and into said member 45 also extends the intake valve 44. The member 45 is clamped in position by an interiorly threaded flanged collar 46 which threadedly engages with the periphery of the casing 29 at the rear end thereof. The collar 46 engages with the threads 31 on casing 29.

The valves 20 are normally closed. The check valves 39 are normally open. The section 41 of the intake tube projects into the plunger 14 as well as opens thereinto. The tubes 38 open into the plunger 14. When the air pressure reduces in the inner tube 6, the spring 28 during the travel of the tire will be forced inwardly shifting the plunger 14 toward the cap 32, thereby closing check valves 39 and compressing the air in the plunger 14.

The forcing of the spring inwardly is had when that portion of the tire, where the spring is located, travels on the ground, and after such part of the tire passes clear of the ground the spring 28 will act to shift the plunger 14 in a direction opposite to that stated, creating a suction, and such action will draw air through the intake tubes 38 into the inner tube 6. The back pressure of air will close the check valves 21. The foregoing operation will be intermittently carried out during the continual travel of the tire and will provide for the necessary amount of air to be supplied to the tube 6 to maintain it under a proper state of inflation.

It is thought the many advantages of an automatically operable tire inflation device, in accordance with this invention, can be readily understood, and although the preferred embodiment of the invention is as illustrated and described, yet it is to be understood that changes in the details of construction can be had which will fall within the scope of the invention as claimed.

What I claim is:

1. An inflation device for pneumatic tires comprising a stationary plunger for positioning inwardly of the felloe of a wheel, said plunger being formed with lengthwise extending intake tubes opening at the ends of the plunger and each provided at one end with a closure valve, a resiliently supported, spring controlled, movable plunger having a head and a tubular portion, the latter being open at one end and having its other end merging into said head, said tubular portion having a part thereof surrounding said stationary plunger, said intake tubes opening into said tubular portion, said head having arranged therein valves for closing said tubular portion to the inner tube of the tire, and suspension means for said stationary plunger for inclosing the latter and adapted to be fixedly secured to and extend inwardly from the felloe of a wheel.

2. An inflation device for pneumatic tires comprising a stationary plunger provided with normally open air intake tubes having closure valves positioned within the intake ends thereof, means adapted to be secured to the felloe of a wheel for suspending and enclosing said plunger, said means spaced from said plunger, a movable plunger provided with a head and a tubular portion, said tubular portion communicating through said head to the inner tube of the tire, said tubular portion surrounding said stationary plunger and said intake tubes opening into said portion, spring controlled valves within said head for closing said tubular portion to the inner tube of the tire, and a controlling spring coupled to the inner end of said movable plunger, said spring providing a resilient support for said movable plunger.

3. An inflation device for pneumatic tires comprising a cylinder adapted to be secured to and extend inwardly from the felloe of a wheel, said cylinder being open at its forward end and closed at its rear end by an apertured cap secured thereto, a stationary plunger suspended from said cap and arranged within and spaced from said cylinder, said plunger being provided with air intake tubes connected therewith and to the cap and having both ends open, closure valves within the intake ends of said tubes and positioned at said cap, a movable plunger provided with a tubular portion and a head, said tubular portion communicating through said head with the inner tube of the tire and further extending into said cylinder and surrounding said stationary plunger, valves within said head for closing said tubular portion to the inner tube of the tire, and a controlling spring for said movable plunger coupled to the inner end of the latter, said spring providing a resilient support for said movable plunger.

In testimony whereof, I affix my signature hereto.

JOHN ORVILLE ECKER.